US008512418B2

(12) United States Patent
Lant et al.

(10) Patent No.: US 8,512,418 B2
(45) Date of Patent: Aug. 20, 2013

(54) ENZYME AND FABRIC HUEING AGENT CONTAINING COMPOSITIONS

(75) Inventors: Neil Joseph Lant, Newcastle upon Tyne (GB); Eugene Steven Sadlowski, Cincinnati, OH (US); Genevieve Cagalawan Wenning, Villa Hills, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 431 days.

(21) Appl. No.: 12/341,708

(22) Filed: Dec. 22, 2008

(65) Prior Publication Data

US 2009/0172895 A1 Jul. 9, 2009

Related U.S. Application Data

(60) Provisional application No. 61/009,982, filed on Jan. 4, 2008, provisional application No. 61/114,599, filed on Nov. 14, 2008.

(51) Int. Cl.
*C09B 67/00* (2006.01)
*C09D 11/00* (2006.01)

(52) U.S. Cl.
USPC ............... 8/137; 510/108; 510/307; 510/392; 435/195

(58) Field of Classification Search
USPC .......... 435/4, 6, 69.1, 183, 200, 252.3, 320.1, 435/195; 510/392, 393, 419, 276, 349, 108, 510/307; 8/137
See application file for complete search history.

(56) References Cited

U.S. PATENT DOCUMENTS

| | | | | |
|---|---|---|---|---|
| 4,430,243 | A | 2/1984 | Bragg | |
| 4,762,636 | A | 8/1988 | Balliello et al. | |
| 4,990,280 | A | 2/1991 | Thorengaard et al. | |
| 5,486,303 | A | 1/1996 | Capeci et al. | |
| 5,489,392 | A | 2/1996 | Capeci et al. | |
| 5,516,448 | A | 5/1996 | Capeci et al. | |
| 5,565,422 | A | 10/1996 | Del Greco et al. | |
| 5,569,645 | A | 10/1996 | Dinniwell et al. | |
| 5,574,005 | A | 11/1996 | Welch et al. | |
| 5,576,282 | A | 11/1996 | Miracle et al. | |
| 5,595,967 | A | 1/1997 | Miracle et al. | |
| 5,597,936 | A | 1/1997 | Perkins et al. | |
| 5,691,297 | A | 11/1997 | Nassano et al. | |
| 5,879,584 | A | 3/1999 | Bianchetti et al. | |
| 5,916,796 | A * | 6/1999 | Jørgensen et al. | 510/321 |
| 6,103,685 | A | 8/2000 | Hall | |
| 6,225,464 | B1 | 5/2001 | Hiler, II et al. | |
| 6,268,197 | B1 | 7/2001 | Schulein et al. | |
| 6,291,412 | B1 | 9/2001 | Kvita et al. | |
| 6,306,812 | B1 | 10/2001 | Perkins et al. | |
| 6,326,348 | B1 | 12/2001 | Vinson et al. | |
| 6,815,192 | B2 * | 11/2004 | Schnorr et al. | 435/210 |
| 7,172,891 | B2 | 2/2007 | Rey et al. | |
| 7,208,459 | B2 | 4/2007 | Sadlowski et al. | |
| 7,361,736 | B2 | 4/2008 | Schnorr et al. | |
| 2003/0022807 | A1 * | 1/2003 | Wilting et al. | 510/392 |
| 2003/0032162 | A1 | 2/2003 | Schnorr et al. | |
| 2003/0087790 | A1 | 5/2003 | Puelle et al. | |
| 2003/0087791 | A1 | 5/2003 | Bonelli et al. | |
| 2003/0203467 | A1 | 10/2003 | Gualfetti et al. | |
| 2004/0048764 | A1 | 3/2004 | Kim et al. | |
| 2005/0003983 | A1 | 1/2005 | Kim et al. | |
| 2005/0227891 | A1 | 10/2005 | Dreyer et al. | |
| 2006/0079438 | A1 * | 4/2006 | Brush et al. | 510/516 |
| 2006/0183658 | A1 * | 8/2006 | Sadlowski et al. | 510/392 |
| 2007/0197416 | A1 * | 8/2007 | Pegelow et al. | 510/302 |
| 2007/0244020 | A1 | 10/2007 | Alapuranen et al. | |
| 2007/0259800 | A1 * | 11/2007 | Boutique et al. | 510/276 |
| 2008/0035885 | A1 | 2/2008 | Hage et al. | |
| 2008/0139442 | A1 | 6/2008 | Lang | |
| 2008/0280325 | A1 | 11/2008 | Johansen et al. | |
| 2009/0036641 | A1 | 2/2009 | Lang et al. | |

FOREIGN PATENT DOCUMENTS

| | | | |
|---|---|---|---|
| WO | WO 99/51714 | A2 | 10/1999 |
| WO | WO 00/32601 | A2 | 6/2000 |
| WO | WO 02/077242 | A2 | 10/2002 |
| WO | WO 2008/110318 | A2 | 9/2008 |

OTHER PUBLICATIONS

Henrissat, Bernard, A Classification of Glycosyl Hydrolases Based on Amino Acid Sequence Similarities, Biochem. J., 1991, pp. 309-316, vol. 280.
Needleman, Saul B., et al., A General Method Applicable to the Search for Similarities in the Amino Acid Sequence of Two Proteins, J. Mol. Biol., 1970, pp. 443-453, vol. 48.
Rice, Peter, et al., EMBOSS: The European Molecular Biology Open Software Suite, Jun. 2000, pp. 276-277, vol. 16, No. 6.
International Search Report, dated Apr. 21, 2009, International Application No. PCT/IB2008/055469, 4 pages.

* cited by examiner

*Primary Examiner* — Tri V Nguyen
(74) *Attorney, Agent, or Firm* — Melissa G Krasovec; James F McBride

(57) ABSTRACT

This invention relates to compositions comprising certain glycosyl hydrolases and a fabric hueing agent and processes for making and using such compositions.

6 Claims, No Drawings

SEQUENCE LISTING

```
<160> NUMBER OF SEQ ID NOS: 1

<210> SEQ ID NO 1
<211> LENGTH: 524
<212> TYPE: PRT
<213> ORGANISM: Paenibacillus polyxyma

<400> SEQUENCE: 1

Val Val His Gly Gln Thr Ala Lys Thr Ile Thr Ile Lys Val Asp Thr
1               5                   10                  15

Phe Lys Asp Arg Lys Pro Ile Ser Pro Tyr Ile Tyr Gly Thr Asn Gln
            20                  25                  30

Asp Leu Ala Gly Asp Glu Asn Met Ala Ala Arg Arg Leu Gly Gly Asn
        35                  40                  45

Arg Met Thr Gly Tyr Asn Trp Glu Asn Asn Met Ser Asn Ala Gly Ser
    50                  55                  60
```

-continued

```
Asp Trp Gln Gln Ser Ser Asp Asn Tyr Leu Cys Ser Asn Gly Gly Leu
65                  70                  75                  80

Thr Gln Ala Glu Cys Glu Lys Pro Gly Ala Val Thr Thr Ser Phe His
                85                  90                  95

Asp Gln Ser Leu Lys Leu Gly Thr Tyr Ser Leu Val Thr Leu Pro Met
            100                 105                 110

Ala Gly Tyr Val Ala Lys Asp Gly Asn Gly Ser Val Gln Glu Ser Glu
        115                 120                 125

Lys Ala Pro Ser Ala Arg Trp Asn Gln Val Val Asn Ala Lys Asn Ala
    130                 135                 140

Pro Phe Gln Leu Gln Pro Asp Leu Asn Asp Asn Arg Val Tyr Val Asp
145                 150                 155                 160

Glu Phe Val His Phe Leu Val Asn Lys Tyr Gly Thr Ala Ser Thr Lys
                165                 170                 175

Ala Gly Val Lys Gly Tyr Ala Leu Asp Asn Glu Pro Ala Leu Trp Ser
            180                 185                 190

His Thr His Pro Arg Ile His Gly Glu Lys Val Gly Ala Lys Glu Leu
        195                 200                 205

Val Asp Arg Ser Val Ser Leu Ser Lys Ala Val Lys Ala Ile Asp Ala
    210                 215                 220

Gly Ala Glu Val Phe Gly Pro Val Leu Tyr Gly Phe Gly Ala Tyr Lys
225                 230                 235                 240

Asp Leu Gln Thr Ala Pro Asp Trp Asp Ser Val Lys Gly Asn Tyr Ser
                245                 250                 255

Trp Phe Val Asp Tyr Tyr Leu Asp Gln Met Arg Leu Ser Ser Gln Val
            260                 265                 270

Glu Gly Lys Arg Leu Leu Asp Val Phe Asp Val His Trp Tyr Pro Glu
        275                 280                 285

Ala Met Gly Gly Gly Ile Arg Ile Thr Asn Glu Val Gly Asn Asp Glu
    290                 295                 300

Thr Lys Lys Ala Arg Met Gln Ala Pro Arg Thr Leu Trp Asp Pro Thr
305                 310                 315                 320

Tyr Lys Glu Asp Ser Trp Ile Ala Gln Trp Asn Ser Glu Phe Leu Pro
                325                 330                 335

Ile Leu Pro Arg Leu Lys Gln Ser Val Asp Lys Tyr Tyr Pro Gly Thr
            340                 345                 350

Lys Leu Ala Met Thr Glu Tyr Ser Tyr Gly Gly Glu Asn Asp Ile Ser
        355                 360                 365

Gly Gly Ile Ala Met Thr Asp Val Leu Gly Ile Leu Gly Lys Asn Asp
    370                 375                 380

Val Tyr Met Ala Asn Tyr Trp Lys Leu Lys Asp Gly Val Asn Asn Tyr
385                 390                 395                 400

Val Ser Ala Ala Tyr Lys Leu Tyr Arg Asn Tyr Asp Gly Lys Asn Ser
                405                 410                 415

Thr Phe Gly Asp Thr Ser Val Ser Ala Gln Thr Ser Asp Ile Val Asn
            420                 425                 430

Ser Ser Val His Ala Ser Val Thr Asn Ala Ser Asp Lys Glu Leu His
        435                 440                 445

Leu Val Val Met Asn Lys Ser Met Asp Ser Ala Phe Asp Ala Gln Phe
    450                 455                 460

Asp Leu Ser Gly Ala Lys Thr Tyr Ile Ser Gly Lys Val Trp Gly Phe
465                 470                 475                 480

Asp Lys Asn Ser Ser Gln Ile Lys Glu Ala Ala Pro Ile Thr Gln Ile
                485                 490                 495
```

-continued

```
Ser Gly Asn Arg Phe Thr Tyr Thr Val Pro Pro Leu Thr Ala Tyr His
            500                 505                 510

Ile Val Leu Thr Thr Gly Asn Asp Thr Ser Pro Val
        515                 520
```

ENZYME AND FABRIC HUEING AGENT CONTAINING COMPOSITIONS

CROSS REFERENCE TO RELATED APPLICATIONS

This application claims the benefit of U.S. Provisional Application No. 61/009,982 filed 4 Jan. 2008; and U.S. Provisional Application No. 61/114,599 filed 14 Nov. 2008.

FIELD OF INVENTION

This invention relates to compositions comprising certain glycosyl hydrolases and fabric hueing agents.

BACKGROUND OF THE INVENTION

Detergent manufacturers incorporate hueing agents into their laundry detergent products to impart visual fabric benefits to fabric laundered therewith. However, it has proven difficult to deliver adequate consumer acceptable visual benefits and there remains a need to improve the fabric hueing profile of these laundry detergent compositions. The Inventors have found that additionally incorporating certain glycosyl hydrolases into a laundry detergent composition that comprises a hueing agent, improves the whiteness perception and hueing profile of the composition. Without wishing to be bound by theory, the Inventors believe that these glycosyl hyrolases biopolish the fabric surface in such a manner so as to improve the deposition and the performance of the hueing agents.

SUMMARY OF THE INVENTION

This invention relates to compositions comprising certain glycosyl hydrolases and fabric hueing agents and processes for making and using such products.

DETAILED DESCRIPTION OF THE INVENTION

Laundry Detergent Composition

The laundry detergent composition typically comprises from about 0.00003 wt % to about 0.1 wt %, from about 0.00008 wt % to about 0.05 wt %, or even from about 0.0001 wt % to about 0.04 wt %, fabric hueing agent and from about 0.0005 wt % to about 0.1 wt %, from about 0.001 wt % to about 0.05 wt %, or even from about 0.002 wt % to about 0.03 wt % glycosyl hydrolase. The balance of any aspects of the aforementioned composition is made up of one or more adjunct materials. The fabric hueing agent and glycosyl hydrolase are described in more detail below.

The composition may take any form, but preferably the composition is in the form of a liquid. The composition may be in the form of a unit dose pouch, especially when in the form of a liquid, and typically the composition is at least partially, preferably completely, enclosed by a water-soluble pouch.

Solid Laundry Detergent Composition

In one embodiment of the present invention, the composition is a solid laundry detergent composition, preferably a solid laundry powder detergent composition.

The composition preferably comprises from 0 wt % to 10 wt %, or even to 5 wt % zeolite builder. The composition also preferably comprises from 0 wt % to 10 wt %, or even to 5 wt % phosphate builder.

The composition typically comprises anionic detersive surfactant, preferably linear alkyl benzene sulphonate, preferably in combination with a co-surfactant. Preferred co-surfactants are alkyl ethoxylated sulphates having an average degree of ethoxylation of from 1 to 10, preferably from 1 to 3, and/or ethoxylated alcohols having an average degree of ethoxylation of from 1 to 10, preferably from 3 to 7.

The composition preferably comprises chelant, preferably the composition comprises from 0.3 wt % to 2.0 wt % chelant. A suitable chelant is ethylenediamine-N,N'-disuccinic acid (EDDS).

The composition may comprise cellulose polymers, such as sodium or potassium salts of carboxymethyl cellulose, carboxyethyl cellulose, sulfoethyl cellulose, sulfopropyl cellulose, cellulose sulfate, phosphorylated cellulose, carboxymethyl hydroxyethyl cellulose, carboxymethyl hydroxypropyl cellulose, sulfoethyl hydroxyethyl cellulose, sulfoethyl hydroxypropyl cellulose, carboxymethyl methyl hydroxyethyl cellulose, carboxymethyl methyl cellulose, sulfoethyl methyl hydroxyethyl cellulose, sulfoethyl methyl cellulose, carboxymethyl ethyl hydroxyethyl cellulose, carboxymethyl ethyl cellulose, sulfoethyl ethyl hydroxyethyl cellulose, sulfoethyl ethyl cellulose, carboxymethyl methyl hydroxypropyl cellulose, sulfoethyl methyl hydroxypropyl cellulose, carboxymethyl dodecyl cellulose, carboxymethyl dodecoyl cellulose, carboxymethyl cyanoethyl cellulose, and sulfoethyl cyanoethyl cellulose. The cellulose may be a substituted cellulose substituted by two or more different substituents, such as methyl and hydroxyethyl cellulose.

The composition may comprise soil release polymers, such as Repel-o-Tex™. Other suitable soil release polymers are anionic soil release polymers. Suitable soil release polymers are described in more detail in WO05123835A1, WO07079850A1 and WO08110318A2.

The composition may comprise a spray-dried powder. The spray-dried powder may comprise a silicate salt, such as sodium silicate.

Glycosyl Hydrolase

The glycosyl hydrolase has enzymatic activity towards both xyloglucan and amorphous cellulose substrates, wherein the glycosyl hydrolase is selected from GH families 5, 12, 44 or 74.

The enzymatic activity towards xyloglucan substrates is described in more detail below. The enzymatic activity towards amorphous cellulose substrates is described in more detail below.

The glycosyl hydrolase enzyme preferably belongs to glycosyl hydrolase family 44. The glycosyl hydrolase (GH) family definition is described in more detail in Biochem J. 1991, v280, 309-316.

The glycosyl hydrolase enzyme preferably has a sequence at least 70%, or at least 75% or at least 80%, or at least 85%, or at least 90%, or at least 95% identical to sequence ID No. 1.

For purposes of the present invention, the degree of identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends in Genetics* 16: 276-277), preferably version 3.0.0 or later. The optional parameters used are gap open penalty of 10, gap extension penalty of 0.5, and the EBLOSUM62 (EMBOSS version of BLOSUM62) substitution matrix. The output of Needle labeled "longest identity" (obtained using the—no brief option) is used as the percent identity and is calculated as follows: (Identical Residues×100)/(Length of Alignment−Total Number of Gaps in Alignment).

Suitable glycosyl hydrolases are selected from the group consisting of: GH family 44 glycosyl hydrolases from *Paenibacillus polyxyma* (wild-type) such as XYG1006 described in WO 01/062903 or are variants thereof, GH family 12 glycosyl hydrolases from *Bacillus licheniformis* (wild-type) such as Seq. No. ID: 1 described in WO 99/02663 or are variants thereof, GH family 5 glycosyl hydrolases from *Bacillus agaradhaerens* (wild type) or variants thereof, GH family 5 glycosyl hydrolases from *Paenibacillus* (wild type) such as XYG1034 and XYG 1022described in WO 01/064853 or variants thereof, GH family 74 glycosyl hydrolases from *Jonesia* sp. (wild type) such as XYG1020 described in WO 2002/077242 or variants thereof, and GH family 74 glycosyl hydrolases from *Trichoderma Reesei* (wild type), such as the enzyme described in more detail in Sequence ID no. 2 of WO03/089598, or variants thereof.

Preferred glycosyl hydrolases are selected from the group consisting of: GH family 44 glycosyl hydrolases from *Paenibacillus polyxyma* (wild-type) such as XYG1006 or are variants thereof Enzymatic Activity Towards Xyloglucan Substrates An enzyme is deemed to have activity towards xyloglucan if the pure enzyme has a specific activity of greater than 50000 XyloU/g according to the following assay at pH 7.5.

The xyloglucanase activity is measured using AZCL-xyloglucan from Megazyme, Ireland as substrate (blue substrate).

A solution of 0.2% of the blue substrate is suspended in a 0.1M phosphate buffer pH 7.5, 20° C. under stirring in a 1.5 ml Eppendorf tubes (0.75 ml to each), 50 microliters enzyme solution is added and they are incubated in an Eppendorf Thermomixer for 20 minutes at 40° C., with a mixing of 1200 rpm. After incubation the coloured solution is separated from the solid by 4 minutes centrifugation at 14,000 rpm and the absorbance of the supernatant is measured at 600 nm in a 1 cm cuvette using a spectrophotometer. One XyloU unit is defined as the amount of enzyme resulting in an absorbance of 0.24 in a 1 cm cuvette at 600 nm.

Only absorbance values between 0.1 and 0.8 are used to calculate the XyloU activity. If an absorbance value is measured outside this range, optimization of the starting enzyme concentration should be carried out accordingly.

Enzymatic Activity Towards Amorphous Cellulose Substrates

An enzyme is deemed to have activity towards amorphous cellulose if the pure enzyme has a specific activity of greater than 20000 EBG/g according to the following assay at pH 7.5. Chemicals used as buffers and substrates were commercial products of at least reagent grade.

Endoglucanase Activity Assay Materials:

0.1 M phosphate buffer pH 7.5

Cellazyme C tablets, supplied by Megazyme International, Ireland.

Glass microfiber filters, GF/C, 9 cm diameter, supplied by Whatman.

Method:

In test tubes, mix 1 ml pH 7,5 buffer and 5 ml deionised water.

Add 100 microliter of the enzyme sample (or of dilutions of the enzyme sample with known weight:weight dilution factor). Add 1 Cellazyme C tablet into each tube, cap the tubes and mix on a vortex mixer for 10 seconds. Place the tubes in a thermostated water bath, temperature 40° C.

After 15, 30 and 45 minutes, mix the contents of the tubes by inverting the tubes, and replace in the water bath. After 60 minutes, mix the contents of the tubes by inversion and then filter through a GF/C filter. Collect the filtrate in a clean tubes.

Measure Absorbance (Aenz) at 590 nm, with a spectrophotometer. A blank value, Awater, is determined by adding 100 μl water instead of 100 microliter enzyme dilution.

Calculate Adelta=Aenz−Awater.

Adelta must be <0.5. If higher results are obtained, repeat with a different enzyme dilution factor.

Determine DFO.1, where DFO.1 is the dilution factor needed to give Adelta=0.1.

Unit Definition: 1 Endo-Beta-Glucanase activity unit (1 EBG) is the amount of enzyme that gives Adelta=0.10, under the assay conditions specified above. Thus, for example, if a given enzyme sample, after dilution by a dilution factor of 100, gives Adelta=0. 0, then the enzyme sample has an activity of 100 EBG/g.

Suitable Fabric Hueing Agents

Fluorescent optical brighteners emit at least some visible light. In contrast, fabric hueing agents can alter the tint of a surface as they absorb at least a portion of the visible light spectrum. Suitable fabric hueing agents include dyes, dye-clay conjugates, and pigments that satisfy the requirements of Test Method 1 in the Test Method Section of the present specification. Suitable dyes include small molecule dyes and polymeric dyes. Suitable small molecule dyes include small molecule dyes selected from the group consisting of dyes falling into the Colour Index (C.I.) classifications of Direct Blue, Direct Red, Direct Violet, Acid Blue, Acid Red, Acid Violet, Basic Blue, Basic Violet and Basic Red, or mixtures thereof, for example:

(1) Tris-azo direct blue dyes of the formula

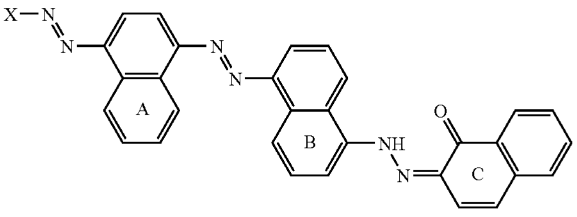

where at least two of the A, B and C napthyl rings are substituted by a sulfonate group, the C ring may be substituted at the 5 position by an $NH_2$ or NHPh group, X is a benzyl or naphthyl ring substituted with up to 2 sulfonate groups and may be substituted at the 2 position with an OH group and may also be substituted with an $NH_2$ or NHPh group.

(2) bis-azo Direct violet dyes of the formula:

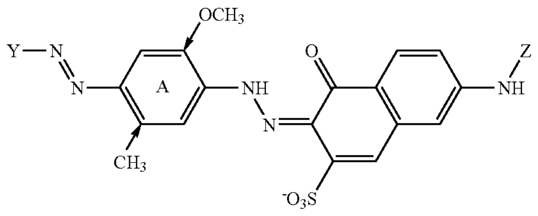

where Z is H or phenyl, the A ring is preferably substituted by a methyl and methoxy group at the positions indicated by arrows, the A ring may also be a naphthyl ring, the Y group is a benzyl or naphthyl ring, which is substituted by sulfate group and may be mono or disubstituted by methyl groups.

(3) Blue or red acid dyes of the formula

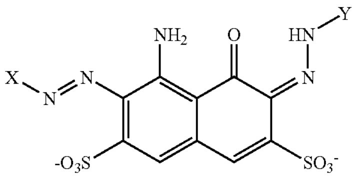

where at least one of X and Y must be an aromatic group. In one aspect, both the aromatic groups may be a substituted benzyl or naphthyl group, which may be substituted with non water-solubilising groups such as alkyl or alkyloxy or aryloxy groups, X and Y may not be substituted with water solubilising groups such as sulfonates or carboxylates. In another aspect, X is a nitro substituted benzyl group and Y is a benzyl group (4) Red acid dyes of the structure

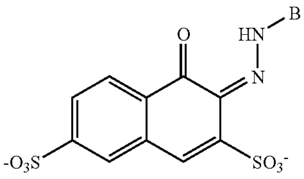

or

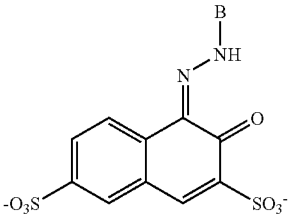

where B is a naphthyl or benzyl group that may be substituted with non water solubilising groups such as alkyl or alkyloxy or aryloxy groups, B may not be substituted with water solubilising groups such as sulfonates or carboxylates.

(5) Dis-azo dyes of the structure

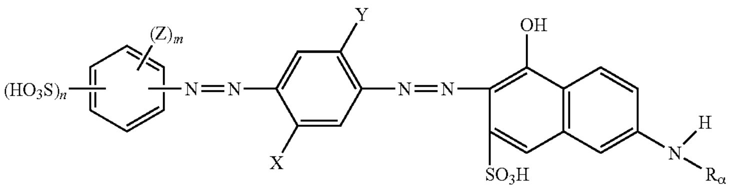

or

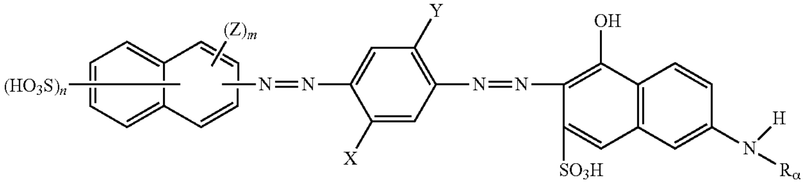

wherein X and Y, independently of one another, are each hydrogen, $C_1$-$C_4$ alkyl or $C_1$-$C_4$-alkoxy, Rα is hydrogen or aryl, Z is $C_1$-$C_4$ alkyl; $C_1C_4$-alkoxy; halogen; hydroxyl or carboxyl, n is 1 or 2 and m is 0, 1 or 2, as well as corresponding salts thereof and mixtures thereof (6) Triphenylmethane dyes of the following structures

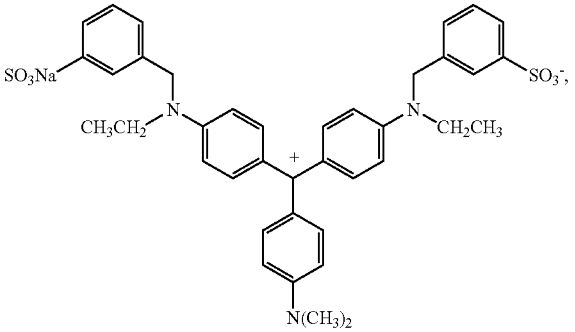

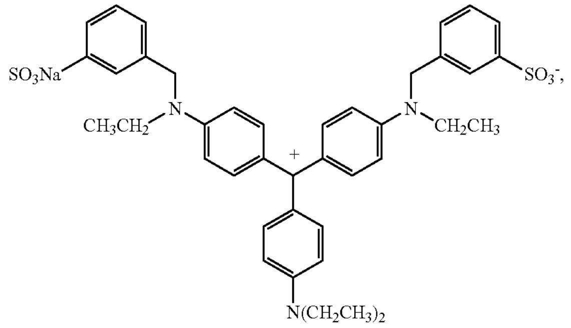

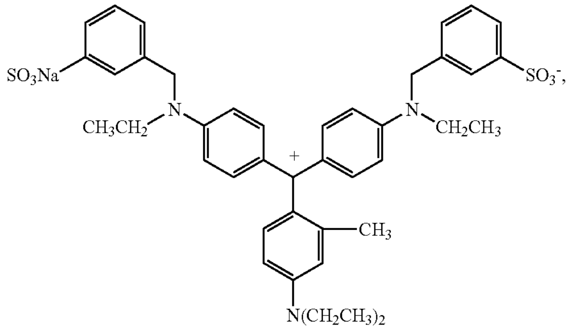

-continued

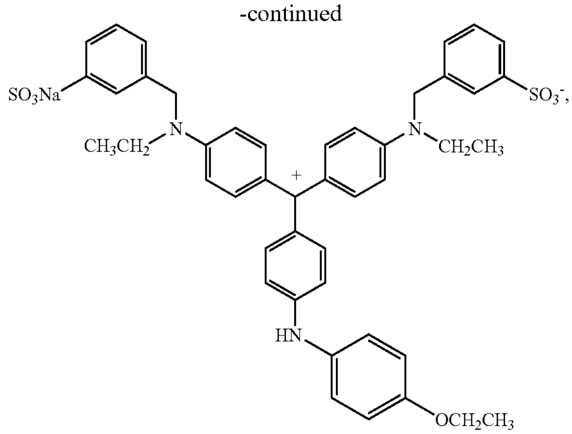

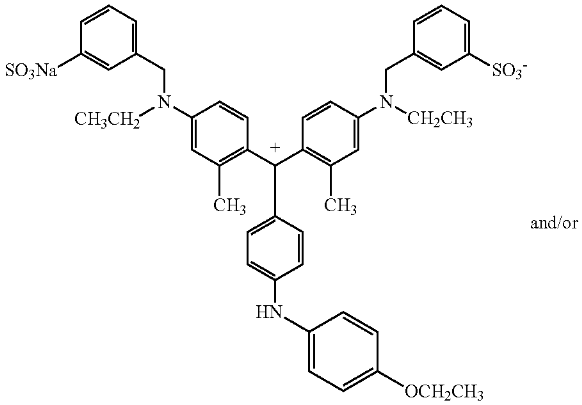

and/or

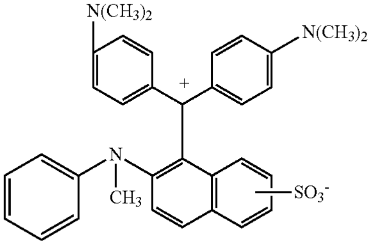

and mixtures thereof. In another aspect, suitable small molecule dyes include small molecule dyes selected from the group consisting of Colour Index (Society of Dyers and Colourists, Bradford, UK) numbers Direct Violet 9, Direct Violet 35, Direct Violet 48, Direct Violet 51, Direct Violet 66, Direct Blue 1, Direct Blue 71, Direct Blue 80, Direct Blue 279, Acid Red 17, Acid Red 73, Acid Red 88, Acid Red 150, Acid Violet 15, Acid Violet 17, Acid Violet 24, Acid Violet 43, Acid Red 52, Acid Violet 49, Acid Blue 15, Acid Blue 17, Acid Blue 25, Acid Blue 29, Acid Blue 40, Acid Blue 45, Acid Blue 75, Acid Blue 80, Acid Blue 83, Acid Blue 90 and Acid Blue 113, Acid Black 1, Basic Violet 1, Basic Violet 3, Basic Violet 4, Basic Violet 10, Basic Violet 35, Basic Blue 3, Basic Blue 16, Basic Blue 22, Basic Blue 47, Basic Blue 66, Basic Blue 75, Basic Blue 159 and mixtures thereof. In another aspect, suitable small molecule dyes include small molecule dyes selected from the group consisting of Colour Index (Society of Dyers and Colourists, Bradford, UK) numbers Acid Violet 17, Acid Violet 43, Acid Red 52, Acid Red 73, Acid Red 88, Acid Red 150, Acid Blue 25, Acid Blue 29, Acid Blue 45, Acid Blue 113, Acid Black 1, Direct Blue 1, Direct Blue 71, Direct Violet 51 and mixtures thereof. In another aspect, suitable small molecule dyes include small molecule dyes selected from the group consisting of Colour Index (Society of Dyers and Colourists, Bradford, UK) numbers Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing conjugated chromogens (dye-polymer conjugates) and polymers with chromogens co-polymerized into the backbone of the polymer and mixtures thereof In another aspect, suitable polymeric dyes include polymeric dyes selected from the group consisting of fabric-substantive colorants sold under the name of Liquitint® (Milliken, Spartanburg, S.C., USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® (Milliken, Spartanburg, S.C., USA) Violet CT, carboxymethyl cellulose (CMC) conjugated with a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow I through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, CI Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I. 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof. In another aspect, suitable pigments include pigments selected from the group consisting of Ultramarine Blue (C.I. Pigment Blue 29), Ultramarine Violet (C.I. Pigment Violet 15) and mixtures thereof.

The aforementioned fabric hueing agents can be used in combination (any mixture of fabric hueing agents can be used). Suitable fabric hueing agents can be purchased from Aldrich, Milwaukee, Wis., USA; Ciba Specialty Chemicals, Basel, Switzerland; BASF, Ludwigshafen, Germany; Dayglo Color Corporation, Mumbai, India; Organic Dyestuffs Corp., East Providence, R.I., USA; Dystar, Frankfurt, Germany; Lanxess, Leverkusen, Germany; Megazyme, Wicklow, Ireland; Clariant, Muttenz, Switzerland; Avecia, Manchester, UK and/or made in accordance with the examples contained herein.

Suitable hueing agents are described in more detail in U.S. Pat. No. 7,208,459 B2.

Adjunct Materials

While not essential for the purposes of the present invention, the non-limiting list of adjuncts illustrated hereinafter are suitable for use in the instant compositions and may be desirably incorporated in certain embodiments of the invention, for example to assist or enhance cleaning performance, for treatment of the substrate to be cleaned, or to modify the aesthetics of the cleaning composition as is the case with perfumes, colorants, dyes or the like. The precise nature of these additional components, and levels of incorporation thereof, will depend on the physical form of the composition and the nature of the cleaning operation for which it is to be used. Suitable adjunct materials include, but are not limited to, surfactants, builders, chelating agents, dye transfer inhibiting agents, dispersants, additional enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, perfumes, structure elasticizing agents, fabric softeners, carriers, hydrotropes, processing aids, solvents and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the adjunct ingredients are not essential to Applicants' compositions. Thus, certain embodiments of Applicants' compositions do not contain one or more of the following adjuncts materials: surfactants, builders, chelating agents, dye transfer inhibiting agents, dispersants, additional enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, perfumes, structure elasticizing agents, fabric softeners, carriers, hydrotropes, processing aids, solvents and/or pigments. However, when one or more adjuncts are present, such one or more adjuncts may be present as detailed below:

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) photobleaches for example sulfonated zinc phthalocyanine sulfonated aluminium phthalocyanines, xanthene dyes and mixtures thereof;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxone®, and mixtures thereof. Suitable percarboxylic acids include hydrophobic and hydrophilic peracids having the formula R—(C═O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C═O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35: 1, or even 2:1 to 10:1.

Surfactants—The cleaning compositions according to the present invention may comprise a surfactant or surfactant system wherein the surfactant can be selected from nonionic surfactants, anionic surfactants, cationic surfactants, ampholytic surfactants, zwitterionic surfactants, semi-polar nonionic surfactants and mixtures thereof When present, surfactant is typically present at a level of from about 0.1% to about 60%, from about 1% to about 50% or even from about 5% to about 40% by weight of the subject composition.

Builders—The cleaning compositions of the present invention may comprise one or more detergent builders or builder systems. When a builder is used, the subject composition will typically comprise at least about 1%, from about 5% to about 60% or even from about 10% to about 40% builder by weight of the subject composition.

Builders include, but are not limited to, the alkali metal, ammonium and alkanolammonium salts of polyphosphates, alkali metal silicates, alkaline earth and alkali metal carbonates, aluminosilicate builders and polycarboxylate compounds, ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, citric acid, oxydisuccinic acid, polymaleic acid, benzene 1,3,5-tricarboxylic acid, carboxymethyloxysuccinic acid, and soluble salts thereof.

Chelating Agents—The cleaning compositions herein may contain a chelating agent. Suitable chelating agents include copper, iron and/or manganese chelating agents and mixtures thereof When a chelating agent is used, the subject composition may comprise from about 0.005% to about 15% or even from about 3.0% to about 10% chelating agent by weight of the subject composition.

Dye Transfer Inhibiting Agents—The cleaning compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof When present in a subject composition, the dye transfer inhibiting agents may be present at levels from about 0.0001% to about 10%, from about 0.01% to about 5% or even from about 0.1% to about 3% by weight of the composition.

Brighteners—The cleaning compositions of the present invention can also contain additional components that may tint articles being cleaned, such as fluorescent brighteners. Suitable fluorescent brightener levels include lower levels of from about 0.01, from about 0.05, from about 0.1 or even from about 0.2 wt % to upper levels of 0.5 or even 0.75 wt %.

Dispersants—The compositions of the present invention can also contain dispersants. Suitable water-soluble organic materials include the homo- or co-polymeric acids or their salts, in which the polycarboxylic acid comprises at least two carboxyl radicals separated from each other by not more than two carbon atoms.

Enzymes—The cleaning compositions can comprise one or more enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, mannanases, pectate lyases, keratinases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof A typical combination is an enzyme cocktail that may comprise, for example, a protease and lipase in conjunction with amylase. When present in a cleaning composition, the aforementioned additional enzymes may be present at levels from about 0.00001% to about 2%, from about 0.0001% to about 1% or even from about 0.001% to about 0.5% enzyme protein by weight of the composition.

Enzyme Stabilizers—Enzymes for use in detergents can be stabilized by various techniques. The enzymes employed herein can be stabilized by the presence of water-soluble sources of calcium and/or magnesium ions in the finished compositions that provide such ions to the enzymes. In case of aqueous compositions comprising protease, a reversible protease inhibitor, such as a boron compound, can be added to further improve stability.

Catalytic Metal Complexes—Applicants' cleaning compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936; 5,595,967. Such cobalt catalysts are readily prepared by known procedures, such as taught for example in U.S. Pat. Nos. 5,597,936, and 5,595,967.

Compositions herein may also suitably include a transition metal complex of ligands such as bispidones (WO 05/042532 A1) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from about 0.005 ppm to about 25 ppm, from about 0.05 ppm to about 10 ppm, or even from about 0.1 ppm to about 5 ppm, of the MRL in the wash liquor.

Suitable transition-metals in the instant transition-metal bleach catalyst include, for example, manganese, iron and chromium. Suitable MRLs include 5,12-diethyl-1,5,8,12-tetraazabicyclo[6.6.2]hexadecane.

Suitable transition metal MRLs are readily prepared by known procedures, such as taught for example in WO 00/32601, and U.S. Pat. No. 6,225,464.

Solvents—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof.

Processes of Making Compositions

The compositions of the present invention can be formulated into any suitable form and prepared by any process chosen by the formulator, non-limiting examples of which are described in Applicants' examples and in U.S. Pat. No. 4,990,280; U.S. 20030087791A1; U.S. 20030087790A1; U.S. 20050003983A1, U.S. 20040048764A; U.S. Pat. Nos. 4,762, 636; 6,291,412; U.S. 20050227891A1; EP 1070115A2; U.S. Pat. Nos. 5,879,584; 5,691,297; 574,005; 5,569,645; 5,565,422; 5,516,448; 5,489,392; 5,486,303 all of which are incorporated herein by reference.

Method of Use

The present invention includes a method for cleaning and/or treating a situs inter alia a fabric surface. Such method includes the steps of contacting an embodiment of Applicants' cleaning composition, in neat form or diluted in a wash liquor, with at least a portion of a fabric surface then optionally rinsing such fabric surface. The fabric surface may be subjected to a washing step prior to the aforementioned rinsing step. For purposes of the present invention, washing includes but is not limited to, scrubbing, and mechanical agitation. Accordingly, the present invention includes a method for laundering a fabric. The method comprises the steps of contacting a fabric to be laundered with a said cleaning laundry solution comprising at least one embodiment of Applicants' composition. The fabric may comprise most any fabric capable of being laundered in normal consumer use conditions. The solution preferably has a pH of from about 7 to about 11. The compositions may be employed at concentrations of from about 500 ppm to about 15,000 ppm in solution. The water temperatures typically range from about 5° C. to about 90° C. The water to fabric ratio is typically from about 1:1 to about 30:1.

TEST METHOD 1

A protocol to define whether a dye or pigment material is a fabric hueing agent for the purpose of the invention is given here:

1.) Fill two tergotometer pots with 800 ml of Newcastle upon Tyne, UK, City Water (~12 grains per US gallon total hardness, supplied by Northumbrian Water, Pity Me, Durham, Co. Durham, UK).
2) Insert pots into tergotometer, with water temperature controlled at 30° C. and agitation set at 40 rpm for the duration of the experiment.
3) Add 4.8 g of IEC-B detergent (IEC 60456 Washing Machine Reference Base Detergent Type B), supplied by wfk, Brüggen-Bracht, Germany, to each pot.
4) After two minutes, add 2.0 mg active colorant to the first pot.
5) After one minute, add 50 g of flat cotton vest (supplied by Warwick Equest, Consett, County Durham, UK), cut into 5 cm×5 cm swatches, to each pot.
6) After 10 minutes, drain the pots and re-fill with cold Water (16° C.) having a water hardness of 14.4 English Clark Degrees Hardness with a 3:1 Calcium to Magnesium molar ratio.
7) After 2 minutes rinsing, remove fabrics.
8) Repeat steps 3-7 for a further three cycles using the same treatments.
9) Collect and line dry the fabrics indoors for 12 hours.
10) Analyse the swatches using a Hunter Miniscan spectrometer fitted with D65 illuminant and UVA cutting filter, to obtain Hunter a (red-green axis) and Hunter b (yellow-blue axis) values.
11) Average the Hunter a and Hunter b values for each set of fabrics. If the fabrics treated with colorant under assessment show an average difference in hue of greater than 0.2 units on either the a axis or b axis, it is deemed to be a fabric hueing agent for the purpose of the invention.

EXAMPLE

Examples 1-8

Liquid laundry detergent compositions suitable for front-loading automatic washing machines.

| | Composition (wt % of composition) | | | | | | | |
|---|---|---|---|---|---|---|---|---|
| Ingredient | 1 | 2 | 3 | 4 | 5 | 6 | 7 | 8 |
| Alkylbenzene sulfonic acid | 7 | 11 | 4.5 | 1.2 | 1.5 | 12.5 | 5.2 | 4 |
| Sodium $C_{12-14}$ alkyl ethoxy 3 sulfate | 2.3 | 3.5 | 4.5 | 4.5 | 7 | 18 | 1.8 | 2 |
| $C_{14-15}$ alkyl 8-ethoxylate | 5 | 8 | 2.5 | 2.6 | 4.5 | 4 | 3.7 | 2 |
| $C_{12}$ alkyl dimethyl amine oxide | — | — | 0.2 | — | — | — | — | — |
| $C_{12-14}$ alkyl hydroxyethyl dimethyl ammonium chloride | — | — | — | 0.5 | — | — | — | — |
| $C_{12-18}$ Fatty acid | 2.6 | 4 | 4 | 2.6 | 2.8 | 11 | 2.6 | 1.5 |
| Citric acid | 2.6 | 3 | 1.5 | 2 | 2.5 | 3.5 | 2.6 | 2 |
| Protease (Purafect ® Prime) | 0.5 | 0.7 | 0.6 | 0.3 | 0.5 | 2 | 0.5 | 0.6 |
| Amylase (Natalase ®) | 0.1 | 0.2 | 0.15 | — | 0.05 | 0.5 | 0.1 | 0.2 |
| Mannanase (Mannaway ®) | 0.05 | 0.1 | 0.05 | — | — | 0.1 | 0.04 | — |
| Xyloglucanase XYG1006* (mg aep/100 g detergent) | 1 | 4 | 3 | 3 | 2 | 8 | 2.5 | 4 |
| Random graft co-polymer[1] | 1 | 0.2 | 1 | 0.4 | 0.5 | 2.7 | 0.3 | 1 |
| A compound having the following general structure: bis($(C_2H_5O)(C_2H_4O)n$)$(CH_3)$—$N^+$—$C_xH_{2x}$—$N^+$—$(CH_3)$-bis($(C_2H_5O)(C_2H_4O)n$), wherein n = from 20 to 30, and x = from 3 to 8, or sulphated or sulphonated variants thereof | 0.4 | 2 | 0.4 | 0.6 | 1.5 | 1.8 | 0.7 | 0.3 |
| Ethoxylated Polyethylenimine[2] | — | — | — | — | — | 0.5 | — | — |
| Amphiphilic alkoxylated grease cleaning polymer[3] | 0.1 | 0.2 | 0.1 | 0.2 | 0.3 | 0.3 | 0.2 | 0.3 |
| Diethoxylated poly (1,2 propylene terephthalate short block soil release polymer. | — | — | — | — | — | — | 0.3 | — |

-continued

| Ingredient | Composition (wt % of composition) 1 | 2 | 3 | 4 | 5 | 6 | 7 | 8 |
|---|---|---|---|---|---|---|---|---|
| Diethylenetriaminepenta(methylene-phosphonic) acid | 0.2 | 0.3 | — | — | 0.2 | — | 0.2 | 0.3 |
| Hydroxyethane diphosphonic acid | — | — | 0.45 | — | — | 1.5 | — | 0.1 |
| FWA | 0.1 | 0.2 | 0.1 | — | — | 0.2 | 0.05 | 0.1 |
| Solvents (1,2 propanediol, ethanol), stabilizers | 3 | 4 | 1.5 | 1.5 | 2 | 4.3 | 2 | 1.5 |
| Hydrogenated castor oil derivative structurant | 0.4 | 0.4 | 0.3 | 0.1 | 0.3 | — | 0.4 | 0.5 |
| Boric acid | 1.5 | 2.5 | 2 | 1.5 | 1.5 | 0.5 | 1.5 | 1.5 |
| Na formate | — | — | — | 1 | — | — | — | — |
| Reversible protease inhibitor[4] | — | — | 0.002 | — | — | — | — | — |
| Perfume | 0.5 | 0.7 | 0.5 | 0.5 | 0.8 | 1.5 | 0.5 | 0.8 |
| Perfume MicroCapsules slurry (30% am) | 0.2 | 0.3 | 0.7 | 0.2 | 0.05 | 0.4 | 0.9 | 0.7 |
| Ethoxylated thiophene Hueing Dye[5] | 0.005 | 0.007 | 0.010 | 0.008 | 0.008 | 0.007 | 0.007 | 0.008 |
| Buffers (sodium hydroxide, Monoethanolamine) | To pH 8.2 | | | | | | | |
| Water and minors (antifoam, aesthetics) | To 100% | | | | | | | |

Examples 9-16

Liquid laundry detergent compositions suitable for top-loading automatic washing machines.

| Ingredient | Composition (wt % of composition) 9 | 10 | 11 | 12 | 13 | 14 | 15 | 16 |
|---|---|---|---|---|---|---|---|---|
| $C_{12-15}$ Alkylethoxy(1.8)sulfate | 20.1 | 15.1 | 20.0 | 15.1 | 13.7 | 16.7 | 10.0 | 9.9 |
| $C_{11.8}$ Alkylbenzene sulfonate | 2.7 | 2.0 | 1.0 | 2.0 | 5.5 | 5.6 | 3.0 | 3.9 |
| $C_{16-17}$ Branched alkyl sulfate | 6.5 | 4.9 | | 4.9 | 3.0 | 9.0 | 2.0 | |
| $C_{12-14}$ Alkyl-9-ethoxylate | 0.8 | 0.8 | 0.8 | 0.8 | 8.0 | 1.5 | 0.3 | 11.5 |
| $C_{12}$ dimethylamine oxide | | | 0.9 | | | | | |
| Citric acid | 3.8 | 3.8 | 3.8 | 3.8 | 3.5 | 3.5 | 2.0 | 2.1 |
| $C_{12-18}$ fatty acid | 2.0 | 1.5 | 2.0 | 1.5 | 4.5 | 2.3 | | 0.9 |
| Protease (Purafect ® Prime) | 1.5 | 1.5 | 0.5 | 1.5 | 1.0 | 1.8 | 0.5 | 0.5 |
| Amylase (Natalase ®) | 0.3 | 0.3 | 0.3 | 0.3 | 0.2 | 0.4 | | |
| Amylase (Stainzyme ®) | | | | | | | | 1.1 |
| Mannanase (Mannaway ®) | 0.1 | | | | | 0.1 | | |
| Pectate Lyase (Pectawash ®) | 0.1 | | | | | 0.2 | | |
| Xyloglucanase XYG1006* (mg aep/100 g detergent) | 5 | 13 | 2 | 5 | 20 | 1 | 2 | 3 |
| Borax | 3.0 | 3.0 | | | 2.0 | 3.0 | 3.0 | 3.3 |
| Na & Ca formate | 0.2 | 0.2 | | 0.2 | 0.2 | | 0.7 | |
| A compound having the following general structure: bis($(C_2H_5O)(C_2H_4O)n$)($CH_3$)—$N^+$—$C_xH_{2x}$—$N^+$—($CH_3$)-bis($(C_2H_5O)(C_2H_4O)n$), wherein n = from 20 to 30, and x = from 3 to 8, or sulphated or sulphonated variants thereof | 1.6 | 1.6 | 3.0 | 1.6 | 2.0 | 1.6 | 1.3 | 1.2 |
| Random graft co-polymer[1] | 0.4 | 0.2 | 1.0 | 0.5 | 0.6 | 1.0 | 0.8 | 1.0 |
| Diethylene triamine pentaacetic acid | 0.4 | 0.4 | 0.4 | 0.4 | 0.2 | 0.3 | 0.8 | |
| Tinopal AMS-GX | 0.2 | 0.2 | 0.2 | 0.2 | 0.2 | 0.3 | 0.1 | |
| Tinopal CBS-X | | | | | | 0.1 | | 0.2 |
| Amphiphilic alkoxylated grease cleaning polymer[3] | 1.0 | 1.3 | 1.3 | 1.4 | 1.0 | 1.1 | 1.0 | 1.0 |
| Texcare 240N (Clariant) | | | | 1.0 | | | | |
| Ethanol | 2.6 | 2.6 | 2.6 | 2.6 | 1.8 | 3.0 | 1.3 | |
| Propylene Glycol | 4.6 | 4.6 | 4.6 | 4.6 | 3.0 | 4.0 | 2.5 | |
| Diethylene glycol | 3.0 | 3.0 | 3.0 | 3.0 | 3.0 | 2.7 | 3.6 | |
| Polyethylene glycol | 0.2 | 0.2 | 0.2 | 0.2 | 0.1 | 0.3 | 0.1 | 1.4 |
| Monoethanolamine | 2.7 | 2.7 | 2.7 | 2.7 | 4.7 | 3.3 | 1.7 | 0.4 |
| Triethanolamine | | | | | | | | 0.9 |

-continued

| Ingredient | Composition (wt % of composition) | | | | | | | |
|---|---|---|---|---|---|---|---|---|
| | 9 | 10 | 11 | 12 | 13 | 14 | 15 | 16 |
| NaOH | to pH 8.3 | to pH 8.3 | to pH 8.3 | to pH 8.3 | to pH 8.3 | to pH 8.3 | to pH 8.3 | to pH 8.5 |
| Suds suppressor | | | | | | | | |
| Dye | 0.01 | 0.01 | 0.01 | | 0.01 | 0.01 | 0.01 | 0.0 |
| Perfume | 0.5 | 0.5 | 0.5 | 0.5 | 0.7 | 0.7 | 0.8 | 0.6 |
| Perfume MicroCapsules slurry (30% am) | 0.2 | 0.5 | 0.2 | 0.3 | 0.1 | 0.3 | 0.9 | 1.0 |
| Ethoxylated thiophene Hueing Dye[5] | 0.003 | 0.002 | 0.002 | 0.005 | 0.002 | 0.004 | 0.004 | 0.003 |
| Water | balance | balance | balance | balance | balance | balance | balance | balance |

Examples 17-22

The following are granular detergent compositions produced in accordance with the invention suitable for laundering fabrics.

| | 17 | 18 | 19 | 20 | 21 | 22 |
|---|---|---|---|---|---|---|
| Linear alkylbenzenesulfonate with aliphatic carbon chain length $C_{11}$-$C_{12}$ | 15 | 12 | 20 | 10 | 12 | 13 |
| Other surfactants | 1.6 | 1.2 | 1.9 | 3.2 | 0.5 | 1.2 |
| Phosphate builder(s) | 2 | 25 | 4 | 3 | 2 | |
| Zeolite | | 1 | | 1 | 4 | 1 |
| Silicate | 4 | 5 | 2 | 3 | 3 | 5 |
| Sodium Carbonate | 9 | 20 | 10 | 17 | 5 | 23 |
| Polyacrylate (MW 4500) | 1 | 0.6 | 1 | 1 | 1.5 | 1 |
| Carboxymethyl cellulose (Finnfix BDA ex CPKelco) | 1 | — | 0.3 | — | 1.1 | — |
| Xyloglucanase XYG1006* (mg aep/100 g detergent) | 1.5 | 2.4 | 1.7 | 0.9 | 5.3 | 2.3 |
| Other enzymes powders | 0.23 | 0.17 | 0.5 | 0.2 | 0.2 | 0.6 |
| Fluorescent Brightener(s) | 0.16 | 0.06 | 0.16 | 0.18 | 0.16 | 0.16 |
| Diethylenetriamine pentaacetic acid or Ethylene diamine tetraacetic acid | 0.6 | | 0.6 | 0.25 | 0.6 | 0.6 |
| $MgSO_4$ | 1 | 1 | 1 | 0.5 | 1 | 1 |
| Bleach(es) and Bleach activator(s) | 6.88 | | 6.12 | 2.09 | 1.17 | 4.66 |
| Ethoxylated thiophene Hueing Dye[5] | 0.002 | 0.001 | 0.003 | 0.003 | — | — |
| Direct Violet 9 ex Ciba Specialty Chemicals | | | | 0.0006 | 0.0004 | 0.0006 |
| Sulfate/Moisture/perfume | | | Balance to 100% | | | |

Examples 23-28

The following are granular detergent compositions produced in accordance with the invention suitable for laundering fabrics.

| | 23 | 24 | 25 | 26 | 27 | 28 |
|---|---|---|---|---|---|---|
| Linear alkylbenzenesulfonate with aliphatic carbon chain length $C_{11}$-$C_{12}$ | 8 | 7.1 | 7 | 6.5 | 7.5 | 7.5 |
| Other surfactants | 2.95 | 5.74 | 4.18 | 6.18 | 4 | 4 |
| Layered silicate | 2.0 | — | 2.0 | — | — | — |
| Zeolite | 7 | — | 2 | — | 2 | 2 |
| Citric Acid | 3 | 5 | 3 | 4 | 2.5 | 3 |
| Sodium Carbonate | 15 | 20 | 14 | 20 | 23 | 23 |
| Silicate | 0.08 | — | 0.11 | — | — | — |
| Soil release agent | 0.75 | 0.72 | 0.71 | 0.72 | — | — |
| Acrylic Acid/Maleic Acid Copolymer | 1.1 | 3.7 | 1.0 | 3.7 | 2.6 | 3.8 |

-continued

| | 23 | 24 | 25 | 26 | 27 | 28 |
|---|---|---|---|---|---|---|
| Carboxymethyl cellulose (Finnfix BDA ex CPKelco) | 0.15 | — | 0.2 | — | 1 | — |
| Xyloglucanase XYG1006* (mg aep/100 g detergent) | 3.1 | 2.34 | 3.12 | 4.68 | 3.52 | 7.52 |
| Other enzyme powders | 0.65 | 0.75 | 0.7 | 0.27 | 0.47 | 0.48 |
| Bleach(es) and bleach activator(s) | 16.6 | 17.2 | 16.6 | 17.2 | 18.2 | 15.4 |
| Azo-CMC ex Megazyme, Ireland | 0.1 | | | 0.15 | 0.12 | 0.44 |
| Ethoxylated thiophene Hueing Dye[5] | | 0.003 | 0.003 | | | |
| Sulfate/Water & Miscellaneous | | | Balance to 100% | | | |

[1]Random graft copolymer is a polyvinyl acetate grafted polyethylene oxide copolymer having a polyethylene oxide backbone and multiple polyvinyl acetate side chains. The molecular weight of the polyethylene oxide backbone is about 6000 and the weight ratio of the polyethylene oxide to polyvinyl acetate is about 40 to 60 and no more than 1 grafting point per 50 ethylene oxide units.

[2]Polyethylenimine (MW = 600) with 20 ethoxylate groups per —NH.

[3]Amphiphilic alkoxylated grease cleaning polymer is a polyethylenimine (MW = 600) with 24 ethoxylate groups per —NH and 16 propoxylate groups per —NH

[4]Reversible Protease inhibitor of structure:

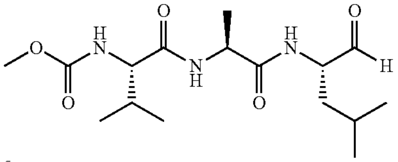

[5]Ethoxylated thiophene Hueing Dye is as described in U.S. Pat. No. 7,208,459 B2.

*Remark: all enzyme levels expressed as % enzyme raw material, except for xyloglucanase where the level is given in mg active enzyme protein per 100 g of detergent. XYG1006 enzyme is according to SEQ ID: 1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A laundry detergent composition comprising:

(a) a glycosyl hydrolase having enzymatic activity towards both xyloglucan and amorphous cellulose substrates, wherein the glycosyl hydrolase is selected from GH families 5, 12, 44 or 74, wherein said glycosyl hydrolase is present at a level of from about 0.001 wt % to about 0.03 wt % of the laundry detergent composition; and (b) a fabric hueing agent, said fabric hueing agent comprising a small molecule dye selected from Direct Blue, Direct Red, Direct Violet, Acid Blue, Acid Red, Acid Violet, or mixtures thereof, wherein said fabric hueing agent is present at a level of from about 0.0001 wt % to about 0.1 wt % of the laundry detergent composition; and (c) a detersive surfactant.

2. A composition according to claim 1, wherein the glycosyl hydrolase enzyme belongs to glycosyl hydrolase family 44.

3. A composition according to claim 1, wherein the glycosyl hydrolase enzyme has a sequence at least 80% homologous to sequence ID No. 1.

4. A composition according to claim 1, wherein the composition is in the form of a liquid.

5. A composition according to claim 1, wherein said small molecule dyes are selected from the group consisting of Direct Violet 9, Direct Violet 35, Direct Violet 48, Direct Violet 51, Direct Violet 66, Direct Blue 1, Direct Blue 71, Direct Blue 80, Direct Blue 279, Acid Red 17, Acid Red 73, Acid Red 88,a cid Red 150, Acid Violet 15, Acid Violet 17, Acid Violet 24, Acid Violet 43, Acid Red 52, Acid Violet 49, Acid Blue 15, Acid Blue 17, Acid Blue 25, Acid Blue 29, Acid Blue 40, Acid Blue 45, Acid Blue 75, Acid Blue 80, Acid Blue 83, Acid Blue 90 and Acid Blue 113, and mixtures thereof.

6. A composition according to claim 1, wherein the small molecule dye is selected from the group consisting of Acid Violet 17, Acid Violet 43, Acid Red 52, Acid Red 73, Acid Red 88, Acid Red 150, Acid Blue 25, Acid Blue 29, Acid Blue 45, Acid Blue 113, Direct Blue 1, Direct Blue 71, Direct Violet 51, and mixtures thereof.

* * * * *